US012638704B2

(12) United States Patent
Maglio et al.

(10) Patent No.: US 12,638,704 B2
(45) Date of Patent: May 26, 2026

(54) ELECTRO-ABSORPTION MODULATOR

(71) Applicants:Airbus SAS, Blagnac (FR); Cardiff University, Cardiff South Glamorgan (GB)

(72) Inventors: Benjamin Maglio, Bristol (GB); Crisanto Quintana Sanchez, Bristol (GB); Peter Smowton, Bristol (GB)

(73) Assignees: AIRBUS SAS, Blagnac (FR); CARDIFF UNIVERSITY, Cardiff South Glamorgan (GB)

( * ) Notice: Subject to any disclaimer, the term of this patent is extended or adjusted under 35 U.S.C. 154(b) by 630 days.

(21) Appl. No.: 17/969,494

(22) Filed: Oct. 19, 2022

(65) Prior Publication Data

US 2023/0127711 A1 Apr. 27, 2023

(30) Foreign Application Priority Data

Oct. 26, 2021 (GB) ...................................... 2115386

(51) Int. Cl.
G02F 1/015 (2006.01)

(52) U.S. Cl.
CPC .................................. G02F 1/0157 (2021.01)

(58) Field of Classification Search
CPC . G02F 1/01; G02F 1/017; G02F 1/015; G02F 1/0157; G02F 1/01725; G02F 1/0175; G02F 1/01758; G02F 1/01766; G02F 1/01708; G02F 1/313; G02F 1/3135; G02F 1/3138; G02F 2202/101; G02F 2202/102; G02F 2203/103; G02F 2202/108; B82Y 10/00; B82Y 20/00; B82Y 30/00

USPC ....... 359/245, 321, 248, 238, 237, 240, 241, 359/247; 257/14, 17, 18, 21, 96
See application file for complete search history.

(56) References Cited

U.S. PATENT DOCUMENTS

| | | | |
|---|---|---|---|
| 4,073,568 A | 2/1978 | Heasley | |
| 6,154,299 A | 11/2000 | Gilbreath | |
| 6,859,474 B1 * | 2/2005 | Johnson | B82Y 10/00 |
| | | | 257/E31.022 |
| 7,729,030 B2 | 6/2010 | Pepper | |
| 10,012,797 B1 * | 7/2018 | Nagarajan | H01S 5/1221 |
| 2004/0070810 A1 | 4/2004 | Yu et al. | |
| 2006/0269183 A1 | 11/2006 | Bour et al. | |
| 2020/0366067 A1 * | 11/2020 | David | B82Y 20/00 |

FOREIGN PATENT DOCUMENTS

| | | |
|---|---|---|
| CN | 102983904 A | 3/2013 |
| JP | H04-174585 | 6/1992 |

OTHER PUBLICATIONS

European Search Report cited in EP 22203638.6 mailed Mar. 3, 2023, 8 pages.

(Continued)

*Primary Examiner* — Jie Lei
(74) *Attorney, Agent, or Firm* — Nixon & Vanderhye P.C.

(57) ABSTRACT

An electro-absorption modulator 100 including a quantum well 102 configured to provide a variable electromagnetic absorption spectrum in response to an applied electric field, wherein the quantum well is a type-II quantum well comprising two material layers, each material layer having a graded material composition, such that the potential in each material layer varies as a function of position.

19 Claims, 7 Drawing Sheets

(56) References Cited

OTHER PUBLICATIONS

Lianping Hou et al., "AlGaInAs/InP Monolithically Integrated DFB Laser Array", IEEE Journal of Quantum Electronics, vol. 48, No. 2, Feb. 2012, 7 pages.

Hin Yiu Anthony Chung et al., "Very Low Threshold Current Density 1.3 μm-InAsP/InGaAsP Strained Quantum Well Grinsch Lasers Grown By Gas Source MBE", 10th Intern. Conf. on Indium Phosphide and Related Materials, May 11-15, 1998, 3 pages.

Combined Search and Examination Report cited in GB2115386.1, mailed Apr. 1, 2022, 6 pages.

Uriel Arad et al, "Development of a Large High-Performance 2-D Array of GaAs-AlGaAs Multiple Quantum-Well Modulators," IEEE Photonics Technology Letters, vol. 15, No. 11, Nov. 2003 (3 pages).

G.C. Gilbreath et al., "Large-aperture multiple quantum well modulating retroreflector for free-space optical data transfer on unmanned aerial vehicles," Opt. Eng. 40(7) 1348-1356, Jul. 2001(10 pages).

Peter Goetz, et al., "Modulating Retro-Reflector Lasercom Systems for Small Unmanned Vehicles," IEEE Journal on Selected Areas in Communications, vol. 30, No. 5, Jun. 2012 (7 pages).

Hideki Kobayashi et al., "Electroabsorption in an AlInAs/InP Type II Superlattice", Jpn. J. Appl. Phys. 32 548, 1993 (5 pages).

C. Buckers et al., Microscopic Electroabsorption Line Shape Analysis For GA (AsSB)/GaAs Heterostructures, J. Appl. Phys, 101, 033118, 2007 (9 pages).

C. Quintana et al., "High Speed Electro-Absorption Modulator for Long Range Retroreflective Free Space Optics," IEEE Photonics Technology Letters, vol. 29, No. 9, May 1, 2017 (4 pages).

Narasimha Prasad, "Optical communications in the mid-wave IR spectralband," Springer Science + Business Media Inc., pp. 347 to 391, 2005 (45 pages).

S.L. Chuang, "Physics of Photonic Devices", Chap. 4: Electroabsorption Modulators, Section 14.4 Quantum Confined Stark Effect (QCSE), 2009 (5 pages).

Peter Blood, "Quantum Confined Laser Devices" Chap. 11 Optical Transitions In Quantum Wells, pp. 172-194 2015 (23 pages).

* cited by examiner

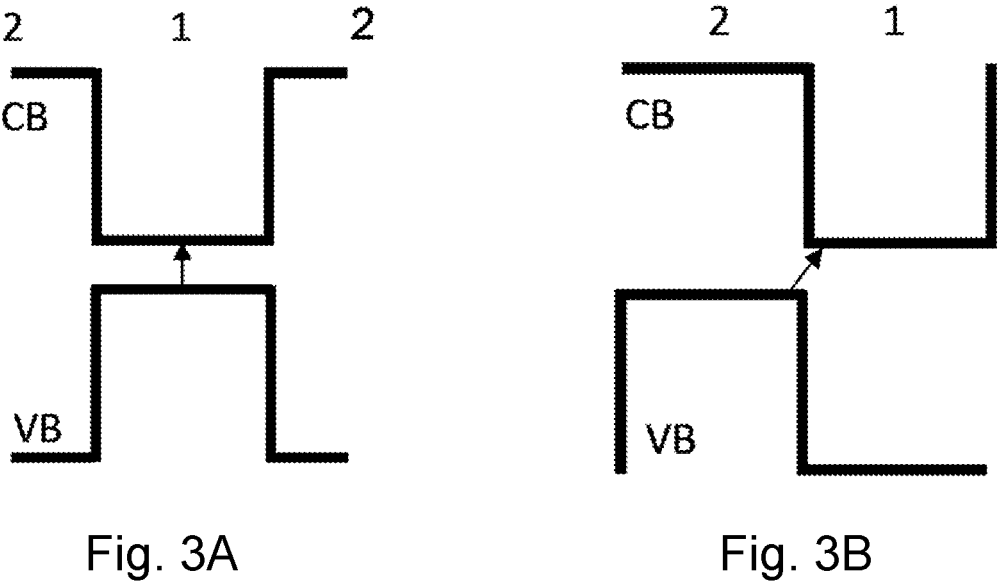
Fig. 3A                    Fig. 3B
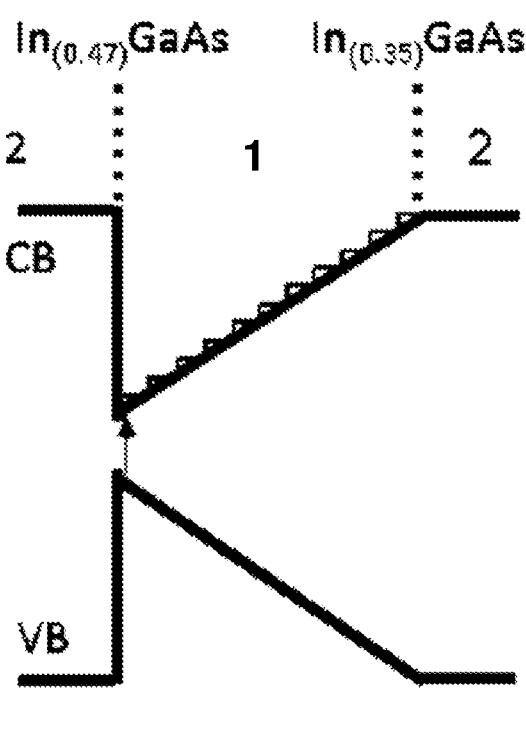
Fig. 4

ELECTRO-ABSORPTION MODULATOR

RELATED APPLICATION

This application incorporates by reference and claims priority to United Kingdom patent application GB 2115386.1, filed Oct. 26, 2021.

FIELD OF THE INVENTION

The present invention concerns electro-absorption modulators (EAMs).

More particularly, but not exclusively, this invention concerns EAMs comprising one or more quantum well structures.

The invention also concerns a modulating retroreflector (MRR) comprising the inventive EAM.

The invention also concerns a free-space optical communications system, comprising the inventive MRR.

BACKGROUND OF THE INVENTION

Electro-absorption modulators (EAMs) have applications in many optoelectronic systems, including, but not limited to, photonic integrated circuits, fiber optics, and free space optical communication.

EAMs are often used to alter the intensity of light over time, embedding highs and lows ("1s" and "0s", or "ons" and "offs") into a continuous beam to transmit binary data. This is done by changing the absorption of the material by applying a voltage across it thereby setting up an electric field within it, creating (for the same wavelength) a regime of low absorption and a regime of high absorption.

This can be used as a compact, lightweight, and low power consuming method of embedding data into an optical signal, which has implications on miniaturizing technology with increasing size, weight and power (SWaP) restrictions.

Rectangular quantum wells (narrow planar layers) are currently used to increase the strength of the modulation effects in EAMs operating at higher temperatures. Multiple such rectangular quantum wells may be employed in series, resulting in a so-called multiple quantum well (MQW) device. Such EAMs based on quantum wells utilize the quantum confined Stark effect (QCSE).

The present invention seeks to provide improved EAMs utilising novel quantum well structures, with applications such as, but not limited to, enhanced modulating retroreflectors (MRRs).

SUMMARY OF THE INVENTION

The present invention provides, according to a first aspect, an electro-absorption modulator, EAM, comprising a quantum well configured to provide a variable electromagnetic absorption spectrum in response to an applied electric field. The quantum well is a type-II quantum well comprising two material layers. Each material layer has a graded material composition, such that the potential in each material layer varies as a function of position.

By graded material composition, it is meant that the material composition of the layer varies over the layer, i.e. the relative proportions of different elements forming the layer change throughout the layer. This results in a non-rectangular potential in the quantum well, such that the potential in the well varies as a function of position, rather than being constant, as in the case of a rectangular quantum well, for example. In this manner, the performance of an EAM having one or more such quantum wells can be improved, in terms of reduced insertion loss and enhanced extinction ratio, for example. This arises as a result of the manner in which the electron, heavy-hole and light-hole wave functions are transformed by the varying, non-rectangular potential.

The potential in the quantum well may be parabolic as a function of position. Alternatively, the potential in the quantum well may be triangular as a function of position.

The quantum well may comprise a first material layer of AlInAs directly adjacent to a second material layer of InAsP. The first material layer of AlInAs may have a thickness in the range 15 nm to 25 nm. The second material layer of InAsP may have a thickness in the range 10 nm to 20 nm. In the first material layer, the proportion of Al may be graded in the range 0.5 to 0.3. In the second material layer, the proportion of As may be graded in the range 0.4 to 0.2.

The quantum well may comprise a first material layer of InGaAs directly adjacent to a second material layer of GaAsSb. The first material layer of InGaAs may have a thickness in the range 15 nm to 25 nm. The second material layer of GaAsSb may have a thickness in the range 10 nm to 20 nm. In the first material layer, the proportion of In may be graded in the range 0.35 to 0.55. In the second material layer, the proportion of As may be graded in the range 0.4 to 0.6.

The EAM may comprise a quantum well region comprising multiple said type-II quantum wells arranged adjacent to each other to provide a multiple quantum well, MQW, structure. Such an MQW structure is anticipated to provide improved performance compared to an EAM employing only a single quantum well.

According to a second aspect of the invention, there is also provided a modulating retroreflector, MRR, comprising the EAM of the first aspect. Such an MRR will benefit from the improved performance of the constituent EAM and provide improved utility in free-space optical communication applications.

According to a third aspect of the invention, there is also provided a free-space optical communications system, comprising the MRR of the second aspect. In such a free-space optical communications system, the MRR may be located on a mobile platform, such as an unmanned aerial vehicle.

It will of course be appreciated that features described in relation to one aspect of the present invention may be incorporated into other aspects of the present invention.

DESCRIPTION OF THE DRAWINGS

Embodiments of the present invention will now be described by way of example only with reference to the accompanying schematic drawings of which:

FIG. 3A shows the energy band structure of a type-I rectangular quantum well.

FIG. 3B shows the energy band structure of a type-II rectangular quantum well.

FIGS. 4 and 5 show the conduction and valence band configuration of type-I quantum wells having a graded material composition.

DETAILED DESCRIPTION

Figure 1:
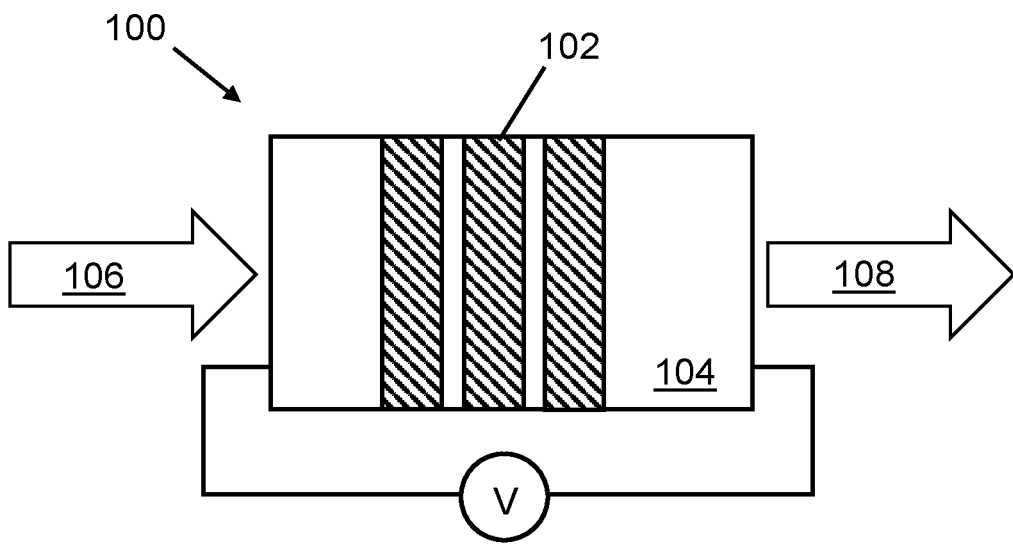
FIG. 1 shows a schematic view of an electro-absorption modulator according to embodiments of the invention.

FIG. 1 shows an electro-absorption modulator (EAM) 100 according to embodiments of the invention. The EAM comprises one or more quantum wells 102 within some substrate material 104. A voltage V can be applied across the EAM in order to establish an electric field within the one or more quantum wells 102 of the EAM. This has the effect of changing the electro-magnetic absorption spectrum of the EAM as a result of the quantum confined Stark effect. Accordingly, an incoming beam of electromagnetic radiation 106, for example near infrared light, can be intensity modulated by modulating the applied voltage V. This effect can be used to produce an on-off keyed output beam 108 and therefore to encode data for onward transmission.

Figure 2:
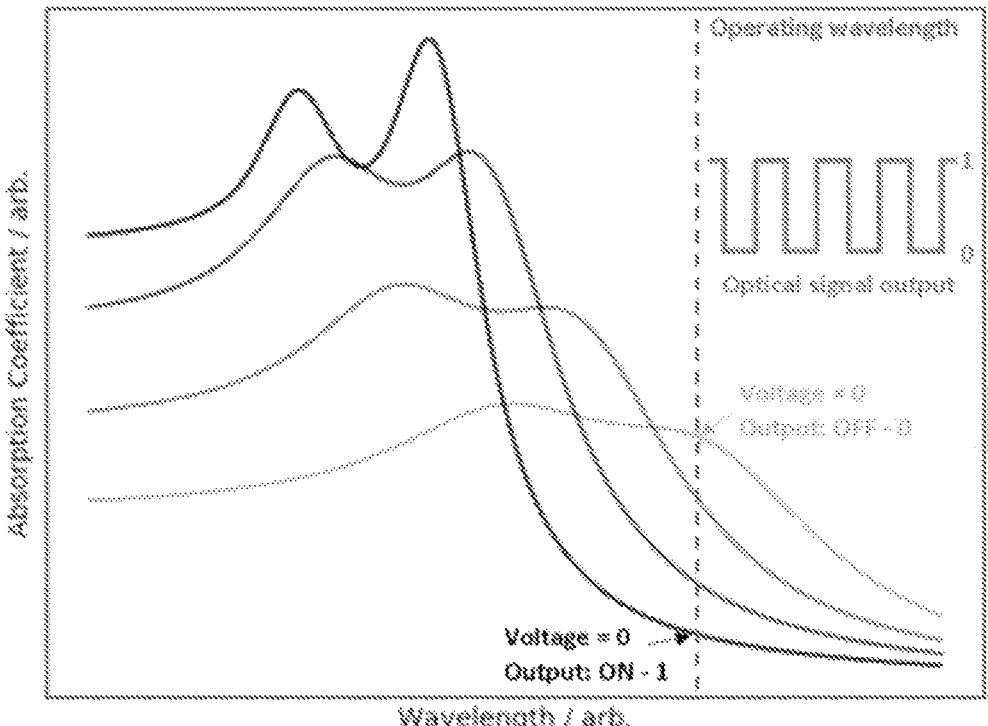
FIG. 2 shows example absorption spectra at different applied voltages for a conventional EAM having one or more rectangular quantum wells.

FIG. 2 shows example absorption spectra at different applied voltages for a conventional EAM having one or more rectangular quantum wells. At the operating wavelength, the absorption coefficient of the EAM can be varied as a function of applied voltage sufficiently to produce an on-off keyed output optical signal.

Quantum wells can be categorised as being either of type-I or type-II. FIG. 3A illustrates the energy band structure of a type-I rectangular quantum well, whereas FIG. 3B illustrates the energy band structure of a type-II rectangular quantum well. In the type-I quantum well, absorption occurs only in material 1 having the smaller band gap (as illustrated by the arrow between the valence and conduction bands of material 1), whereas in the type-II quantum well, absorption occurs between materials 1 and 2 (as illustrated by the arrow between the valence band of material 2 and the conduction band of material 1).

In contrast to the rectangular quantum wells of FIGS. 3A and 3B, FIG. 4 shows schematically the conduction and valence band configuration of a type-I quantum well having a graded material composition. The quantum well comprises a material layer, labelled "1", having a graded material composition, such that the potential in the quantum well varies as a function of position. By graded material composition, it should be understood that the material composition changes over the layer. As an example, rather than growing a single 100 nm thick layer of $In_{(0.43)}Ga_{(0.57)}As$ (43% InAs and 57% GaAs), the composition of the layer is graded through a range of material compositions, such as $In_{(0.35-0.47)}Ga_{(0.65-0.53)}As$.

Figure 5:
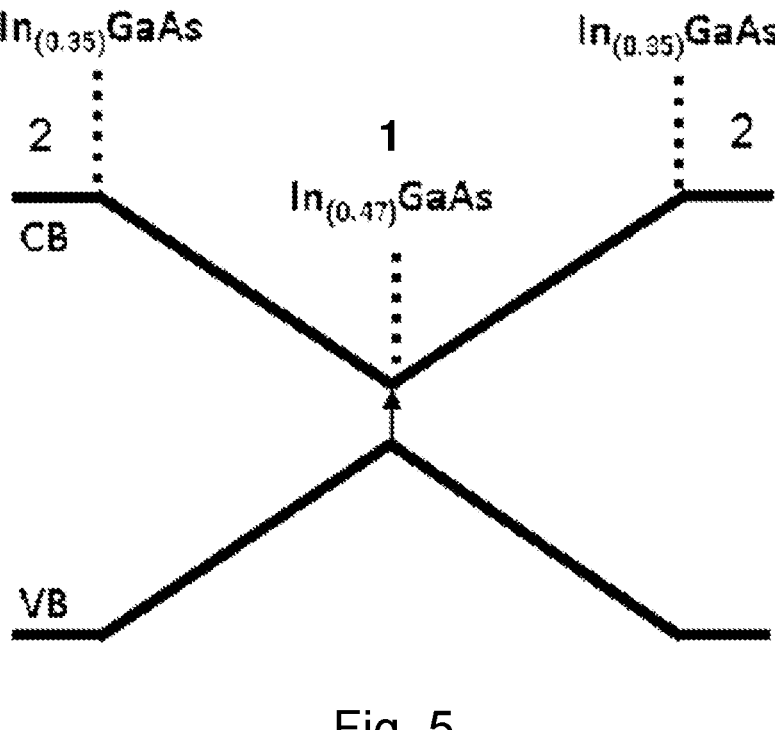

In FIG. 4, the material composition of the layer is graded linearly, giving rise to a potential which is triangular in shape, i.e. it varies linearly over the layer. However, it should be appreciated that more complex structures, such as parabolic potentials can be created by grading the material composition of the graded layer accordingly. It should also be appreciated that the shape of the potential created by grading the material composition can be either symmetric or asymmetric. FIG. 4 shows an asymmetric triangular potential in a type-I quantum well, whereas FIG. 5 shows an example of a symmetric triangular potential in a type-I quantum well. FIGS. 4 and 5 are not embodiments of the invention as they relate to type-I quantum wells. However, it should be appreciated that layers of a type-II quantum well can be graded in a corresponding manner.

Figure 6:
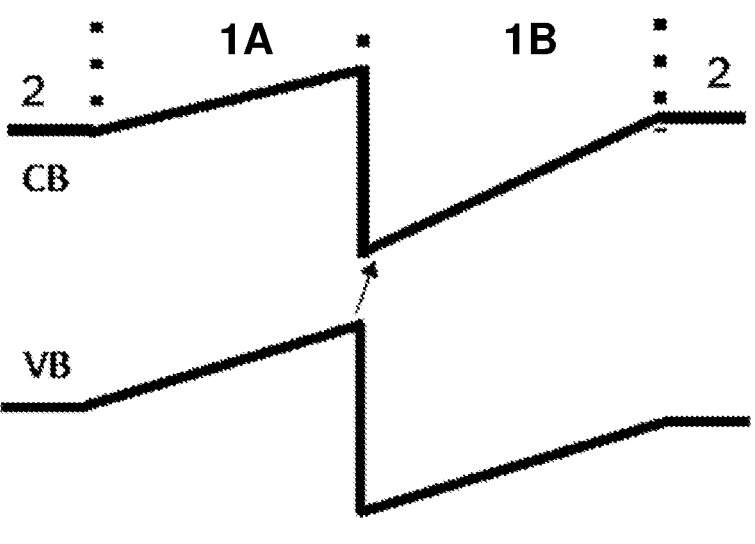
FIG. 6 shows the conduction and valence band configuration of a type-II quantum well employed within EAMs according to embodiments of the invention and having a graded material composition in two layers.

FIG. 6 shows the conduction and valence band configuration of a type-II quantum well employed within an EAM according to an embodiment of the invention. The type-II quantum well comprises two material layers, labelled "1A" and "1B" each of which has a graded material composition. The layers labelled "2" may be described as the barrier material. This is a semiconductor of larger bandgap than the materials used in the quantum well layers, and these provide a barrier to adjacent wells (if present), to prevent coupling of the wave functions between adjacent wells. This barrier layer material is not graded, i.e. it contains a single material composition.

FIG. 6 shows a single period of a graded type-II quantum well. A multiple quantum well structure would contain two or more repetitions or periods of this singular quantum well, each separated by such barrier layers.

In the embodiment of FIG. 6, the material composition in the quantum well is graded in such a manner as to give an asymmetric triangular potential. In this case, absorption takes place across adjacent layers. However, the graded potential maintains proximity between the wavefunctions, which has been found to enhance electro-absorption. The inventors have appreciated that the shape of the potential, and whether the potential is made symmetric or asymmetric, all provide varying control over the optical and electrical properties of the quantum well and hence of the EAM in which one or more of the quantum wells are employed.

EAMs according to embodiments of the invention provide enhanced performance in terms of one or more of the modulation speed, insertion loss, and extinction ratio. In optical communications the insertion loss (IL) is defined as the loss of optical power from transmission through a component, in the case of the electro-absorption modulator, this is when operated for lowest absorption (in "on" state). In EAMs employing quantum wells, this is directly proportional to the overlap between wavefunctions in the conduction and valence bands. The wavefunction overlap integral gives a value between 0 and 1, referring to 0% and 100% of potential material absorption respectively. In type-I quantum wells, this value is often around 1, due to the straddling band alignment and absorption taking place in the same material layer, resulting in high IL. The inventors have appreciated that type-II graded quantum wells significantly reduce the wavefunction overlap integral, due to spatial separation across adjacent layers.

The extinction ratio (ER) is defined as the ratio between the power transmitted by the component when operated for minimum absorption ("on" state) and the power transmitted by the component when operated for maximum absorption ("off" state). In quantum wells, this can be manifested as the change in the wavefunction overlap integral when an external electric field is applied. The inventors have appreciated that significant benefits are observed in type-II graded quantum wells due to the ability to tailor the separation of the wavefunctions such that they do not overlap at zero applied field but are so close that a small applied voltage increases the overlap significantly. Accordingly, a greater increase in overlap at lower electric fields is achieved, resulting in enhanced ERs.

The modulation speed of a quantum well electro-absorption modulator is dictated by a time constant proportional to the capacitance of the device. Thus, the switching capabilities of said devices are directly proportional to area, which can be aided through reductions in pixel size, and are inversely proportional to the total thickness of the intrinsic part of the device. With type-II graded quantum wells, increased overall thickness with reduced IL and increased ER allows for significantly increased modulation speed for the equal IL and ER in equivalent rectangular quantum well structures.

When operating at the same IL and ER as other conventional structures, type-II graded quantum wells yield reductions in power consumption, requiring lower voltages to impart the same modulation. Furthermore, due to spatial separation of the wavefunctions, the low absorption regime occurs when the device receives no voltage, giving an "on" signal through the device, which is energetically favourable for modulator operation, resulting in a lower average power requirement.

Figure 7:
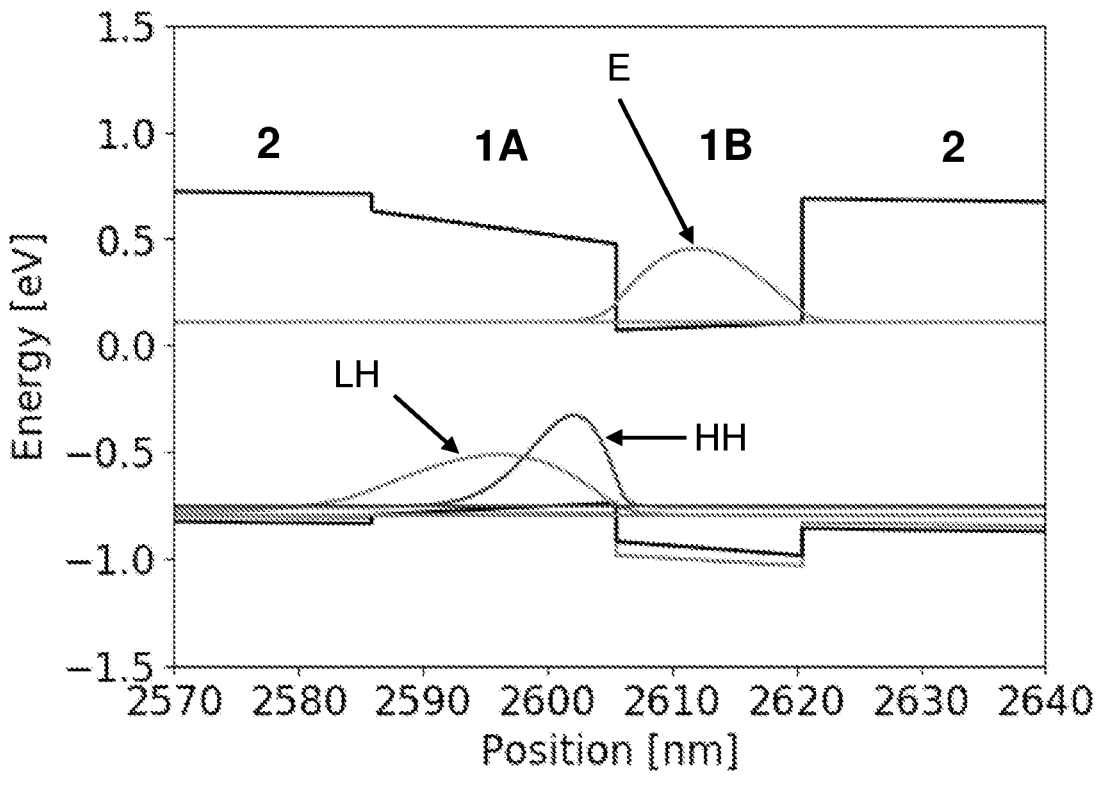
FIGS. 7 and 8 show simulated band structures of type-II quantum wells used in EAMs according to embodiments of the invention.
Figure 8:
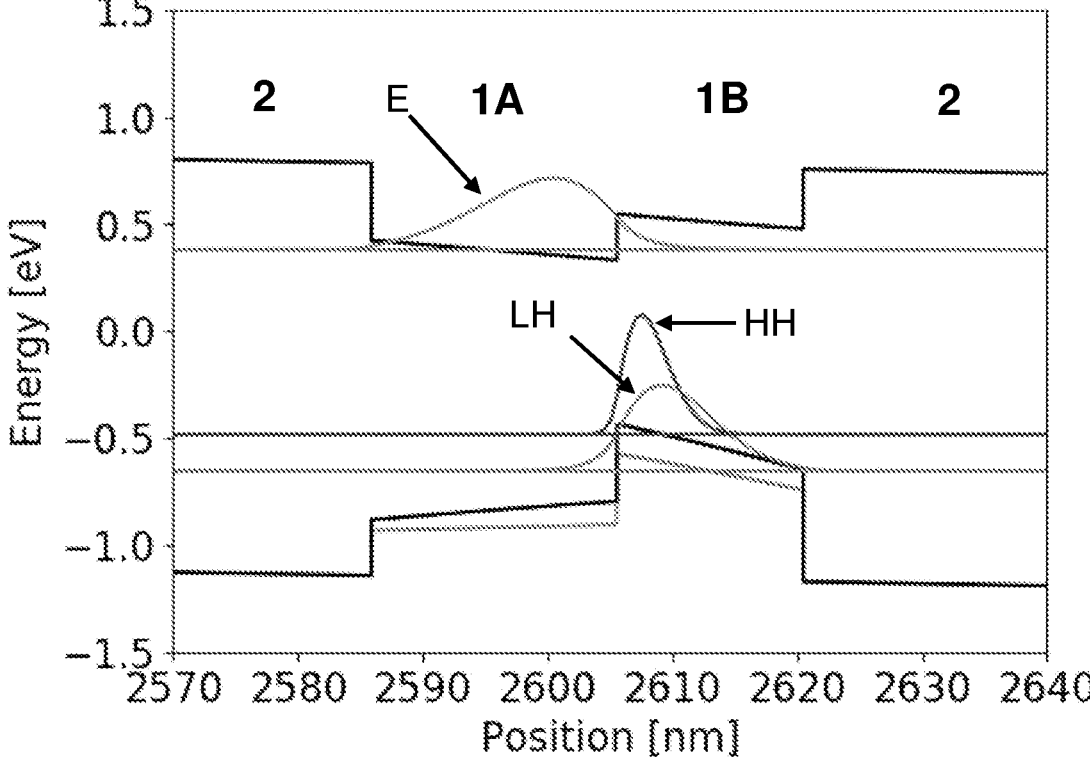

In order to demonstrate at least some of the above advantages of EAMs according to embodiments of the invention, a model was developed to predict the absorption and change in absorption with an applied electric field. For operation close to 1500 nm, two material combinations have been found by the inventors to be highly effective. FIG. 7 shows the simulated band structure of a quantum well according to embodiments of the invention, having a 19 nm thick $Al_{(0.47-0.38)}InAs$ layer adjacent to a 16 nm thick $InAs_{(0.35-0.25)}P$ layer, on an InP substrate. FIG. 8 shows the simulated band structure of a quantum well according to embodiments of the invention, having 20 nm thick $In_{(0.35-0.55)}GaAs$ layer adjacent to a 15 nm thick $GaAs_{(0.4-0.6)}Sb$ layer on a GaAs substrate. The simulated electron (E), heavy-hole (HH) and light-hole (LH) wavefunctions are also illustrated for both cases, in which the minimal overlap between the electron and hole wavefunctions is apparent.

Figure 9:
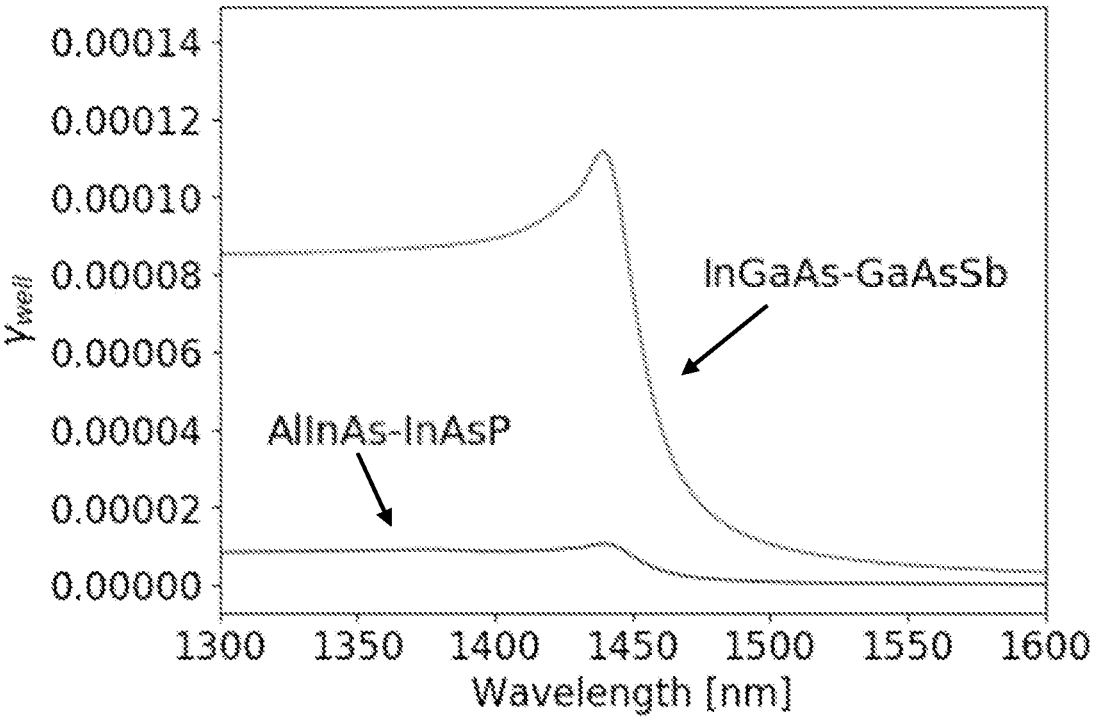
FIGS. 9 and 10 show simulated optical characteristics of the type-II quantum wells shown in FIGS. 7 and 8 respectively.
Figure 10:
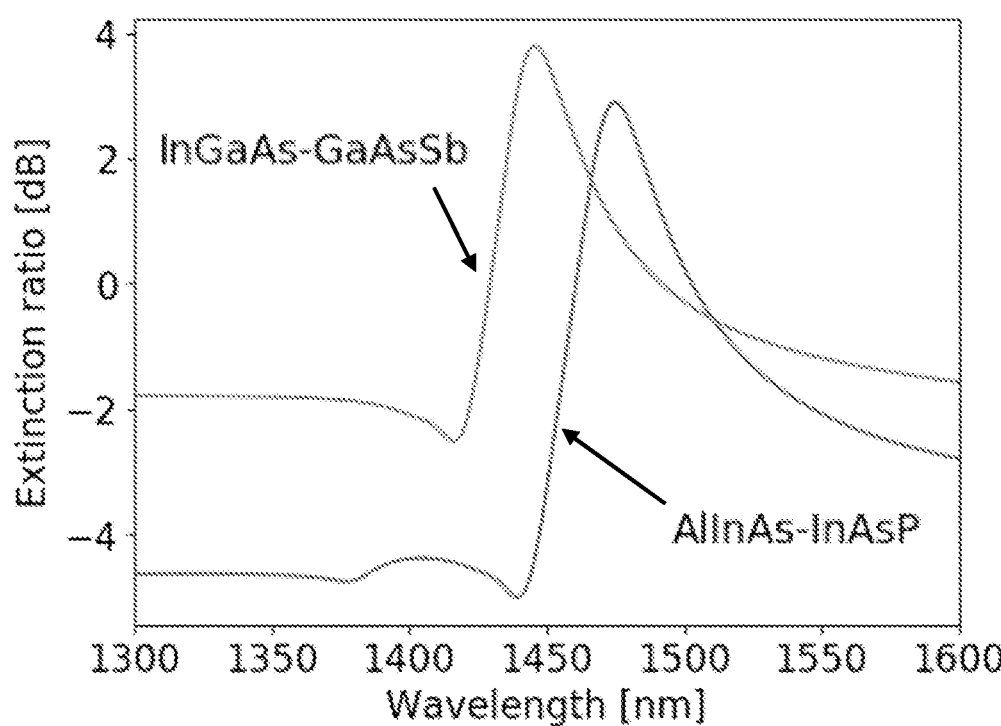

For both quantum well configurations shown in FIGS. 7 and 8, the inventors have observed significant reductions in the predicted IL and substantial increases in the ER. It should be appreciated that the overall magnitude of the IL is dependent on the number of quantum wells in the EAM, and this will vary depending on the application. However, for comparison, a conventional structure has a $\gamma_{well}$, which denotes the fraction of light absorbed by each quantum well, of 0.0005 and an extinction ratio of 2 dB. To compare different quantum wells, a figure of merit may be defined as the ratio between the extinction ratio and the insertion loss. The model results predict $\gamma_{well}$ values over an order of magnitude lower than conventional quantum wells and an extinction ratio of almost double that of conventional quantum wells. This results in figures of merit of around 0.3 as opposed to 0.1 for conventional devices, and therefore indicates a significant improvement provided by the invention. FIG. 9 shows simulated $\gamma_{well}$ values for the quantum well structures of FIGS. 7 and 8. FIG. 10 shows simulated extinction ratio values for the quantum well structures of FIGS. 7 and 8.

Quantum well structures of the kind shown in FIGS. 7 and 8 can be layered in series to provide a multiple quantum well MQW structure with applications in enhanced EAMs. Such enhanced EAMs have a breadth of applications in low-loss, high performance optoelectronic systems. EAMs are typically operated in either normal incidence or edge incidence. Normal incidence devices typically require significant numbers of quantum wells to be grown to achieve reasonable performance. This is due to a relatively small interaction length between the light and the quantum wells. Edge-incident devices can make use of very long interactions lengths and require significantly fewer quantum wells. For optical communications systems operating at 1310 nm and 1550 nm, GaAs and InP based heterostructures are of interest. Here compounds of interest for the quantum wells include InGaAs—GaAsSb as well as InAsP—InGaAs—InP, GaAsSb—InGaAsN—GaAs, InGaAs—GaAsSbBi—GaAs, InAlAs—InPSb—InP, and InGaAsP with either GaAs or InP for 1310 nm or 1550 nm operation respectively.

Figure 11:
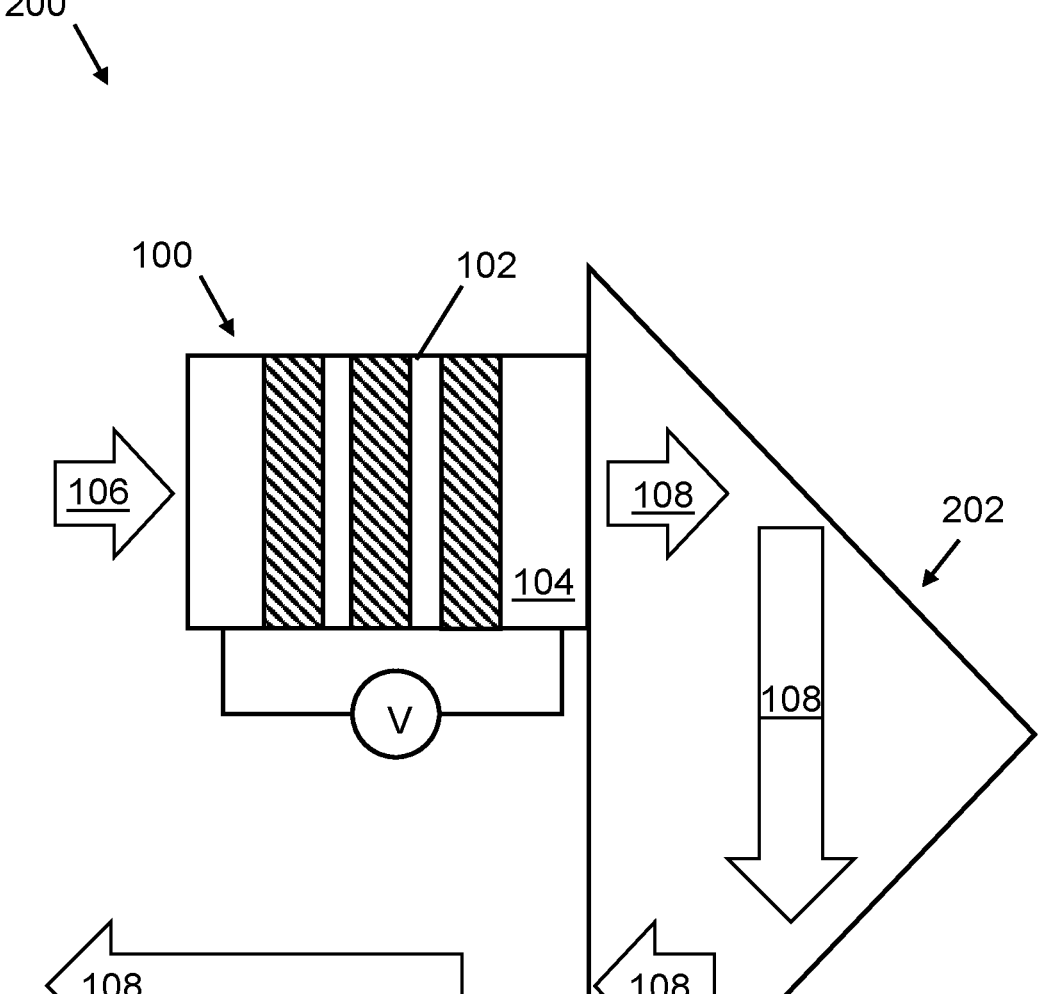
FIG. 11 shows a schematic view of a modulating retroreflector having an EAM according to embodiments of the invention.

One particular application of EAMs according to embodiments of the present invention is within a modulating retroreflector (MRR). An MRR 200 according to embodiments of the invention is illustrated schematically in FIG. 11. The MRR 200 combines an EAM 100 as herein described, having a type-II quantum well which comprises two material layers having graded material compositions, with a corner cube retroreflector 202. Accordingly, an incident beam of light 106 can be intensity modulated by modulating the voltage V applied to the EAM and the modulated beam of light 108 is returned to the source by virtue of the retroreflector. Such an MRR 200 is anticipated to have utility in free space optical communication in aerospace applications.

Figure 12:
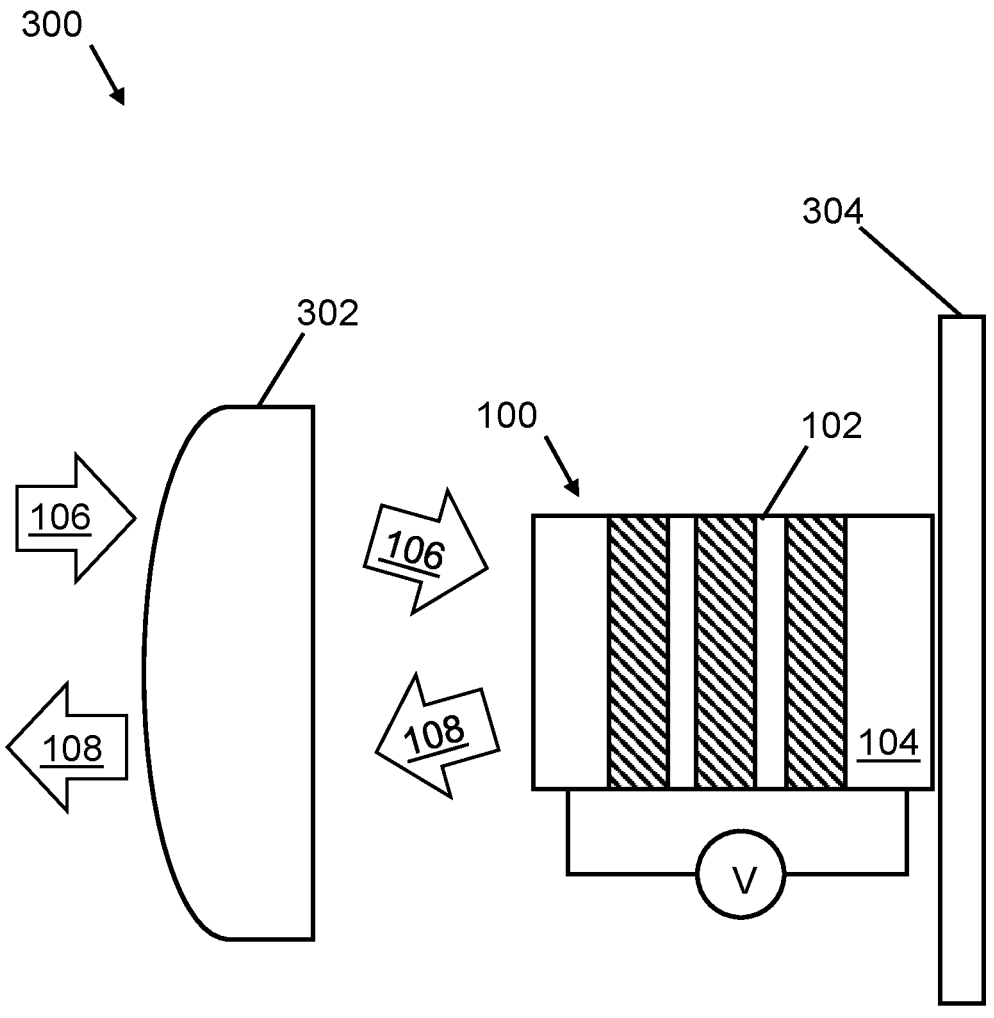
FIG. 12 shows a schematic view of an alternative modulating retroreflector having an EAM according to embodiments of the invention.

FIG. 12 illustrates an alternative MRR 300 according to embodiments of the invention. As above, the MRR 300 combines an EAM 100 as herein described with a retroreflector. Rather than a corner cube retroreflector 202 as in FIG. 11, the retroreflector is in the form of a so-called cats-eye retroreflector. This uses a lens 302 (or a combination of lenses) which direct light to the EAM 100 which is backed by a mirror 304.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

It should be noted that throughout this specification, "or" should be interpreted as "and/or", unless stated otherwise.

The invention claimed is:

1. An electro-absorption modulator comprising:
an input configured to receive an incoming beam of electromagnetic radiation;
a quantum well configured to: (i) provide a variable electromagnetic absorption spectrum (ii) to receive and modulate the incoming beam of electromagnetic radiation in response to an electric field applied to the quantum well, and (iii) generate a modulated beam of electromagnetic radiation, and
an output configured to pass the modulated beam from the electro-absorption modulator,
wherein the quantum well is a type-II quantum well comprising two material layers, wherein a first material layer of the two material layers has a first material composition and a second material layer of the two material layers has a second material composition which differs from the first material composition, and wherein the first material composition and the second composition are each graded such that a potential in each of the two material layers varies as a function of position.

2. The electro-absorption modulator of claim 1, wherein the potential in one or more of the two material layers is parabolic as a function of position.

3. The electro-absorption modulator of claim 1, wherein the potential in one or more of the two material layers is triangular as a function of position.

4. The electro-absorption modulator of claim 1, wherein the first material layer is formed of AlInAs and the second material layer is formed of InAsP, and the second material layer is directly adjacent the first material layer.

5. The electro-absorption modulator of claim 4, wherein the first material layer of AlInAs has a thickness in a range 15 nm to 25 nm.

6. The electro-absorption modulator of claim 4, wherein the second material layer of InAsP has a thickness in a range 10 nm to 20 nm.

7. The electro-absorption modulator of claim 4, wherein in the first material layer the proportion of Al is graded in a range of 0.5 to 0.3.

8. The electro-absorption modulator of claim 1, wherein in the second material layer arsenic (As) is in a graded proportion in a range 0.4 to 0.2.

9. The electro-absorption modulator of claim 1, wherein the first material layer is formed of InGaAs and the second material layer is formed of GaAsSb, and the second material layer is directly adjacent the first material layer.

10. The electro-absorption modulator of claim 9, wherein the first material layer of InGaAs has a thickness in a range 15 nm to 25 nm.

11. The electro-absorption modulator of claim 9, wherein the second material layer of GaAsSb has a thickness in a range 10 nm to 20 nm.

12. The electro-absorption modulator of claim 9, wherein in the first material layer a proportion of In is graded in a range 0.35 to 0.55.

13. The electro-absorption modulator of claim 9, wherein in the second material layer the proportion of As is graded in a range 0.4 to 0.6.

14. The electro-absorption modulator of claim 1, wherein the quantum well is in a quantum well region comprising a plurality of type-II quantum wells, wherein the type-II quantum wells are adjacent each other to provide a multiple quantum well structure.

15. A modulating retroreflector comprising the electro-absorption modulator of claim 1.

16. A free-space optical communications system, comprising the modulating retroreflector of claim 15.

17. The free-space optical communications system of claim 16, wherein the modulating retroreflector is located on an unmanned aerial vehicle.

18. The electro-absorption modulator of claim 1, wherein the first material composition is a first group of chemical elements and a second material composition is a second group of chemical elements that differ from the first group.

19. The electro-absorption modulator of claim 18, wherein relative proportions of the chemical elements of the first group of chemical elements varies as a function of position within the first material layer, and wherein relative proportions of chemical elements in the second group of chemical elements varies as a function of position within the second material layer.

* * * * *